US012646356B2

(12) United States Patent
Kiefer et al.

(10) Patent No.: US 12,646,356 B2
(45) Date of Patent: Jun. 2, 2026

(54) AUTOMATED EYE TRACKING ASSESSMENT SOLUTION FOR SKILL DEVELOPMENT

(71) Applicants: The University of North Carolina at Chapel Hill, Chapel Hill, NC (US); Chiron Performance, Charnwood (AU)

(72) Inventors: Adam Charles Kiefer, Apex, NC (US); Ryan Patrick MacPherson, Chapel Hill, NC (US); Derek Lance Joseph Panchuk, Charnwood (AU)

(73) Assignees: THE UNIVERSITY OF NORTH CAROLINA AT CHAPEL HILL, Chapel Hill, NC (US); CHIRON PERFORMANCE, Charnwood (AU)

( * ) Notice: Subject to any disclaimer, the term of this patent is extended or adjusted under 35 U.S.C. 154(b) by 338 days.

(21) Appl. No.: 18/269,507

(22) PCT Filed: Dec. 30, 2021

(86) PCT No.: PCT/US2021/065652
§ 371 (c)(1),
(2) Date: Jun. 23, 2023

(87) PCT Pub. No.: WO2022/147225
PCT Pub. Date: Jul. 7, 2022

(65) Prior Publication Data
US 2024/0054816 A1 Feb. 15, 2024

Related U.S. Application Data

(60) Provisional application No. 63/132,339, filed on Dec. 30, 2020.

(51) Int. Cl.
*G06V 40/20* (2022.01)
*G06T 7/20* (2017.01)
(Continued)

(52) U.S. Cl.
CPC ............... *G06V 40/23* (2022.01); *G06T 7/20* (2013.01); *G06T 7/70* (2017.01); *G06V 10/764* (2022.01);
(Continued)

(58) Field of Classification Search
CPC ...... G06V 40/23; G06V 10/764; G06V 20/42; G06V 20/52; G06V 40/18; G06V 40/19;
(Continued)

(56) References Cited

U.S. PATENT DOCUMENTS 11,160,450 B2 * 11/2021 Gross ................... A61B 5/0013
2012/0051597 A1 * 3/2012 Fogt ....................... G06F 3/013
382/103
(Continued)

FOREIGN PATENT DOCUMENTS

WO WO-2013-040642 A1 3/2013

OTHER PUBLICATIONS

International Search Report and Written Opinion for PCT/US2021/065652 dated Apr. 28, 2022.
(Continued)

*Primary Examiner* — Amara Abdi
(74) *Attorney, Agent, or Firm* — Jenkins, Taylor & Hunt, P.A.

(57) ABSTRACT

Systems and methods for automated eye tracking assessment for skill development. In some examples, a system includes an eye tracking device; a third-person tracking system comprising at least one external camera; and a computer system comprising one or more processors. The computer system is configured for receiving, while a user is performing a task, eye gaze data from the eye tracking device, a user-view video from the user-view camera or screen capture technology, and, in some examples, an external video of the user from the external camera. The computer system is (Continued)

configured for determining whether or not the user's gaze is fixated on or tracking a specific location or object in a performance space for a threshold amount of time prior to the onset of a movement or a performance action. The computer system is configured for determining a task performance outcome.

35 Claims, 9 Drawing Sheets

(51) Int. Cl.

| | |
|---|---|
| *G06T 7/70* | (2017.01) |
| *G06V 10/764* | (2022.01) |
| *G06V 20/40* | (2022.01) |
| *G06V 20/52* | (2022.01) |
| *G11B 27/34* | (2006.01) |

(52) U.S. Cl.
  CPC .............. *G06V 20/42* (2022.01); *G06V 20/52* (2022.01); *G06T 2207/10016* (2013.01); *G06T 2207/20081* (2013.01); *G06T 2207/30221* (2013.01); *G11B 27/34* (2013.01)

(58) Field of Classification Search
  CPC .. G06V 10/14; G06T 7/20; G06T 7/70; G06T 2207/10016; G06T 2207/20081; G06T 2207/30221; G11B 27/34
  See application file for complete search history.

(56) References Cited

U.S. PATENT DOCUMENTS

| | | | |
|---|---|---|---|
| 2012/0092618 A1* | 4/2012 | Yoo ...................... | A61B 5/1127 351/209 |
| 2015/0002815 A1* | 1/2015 | Gross ................... | A61B 3/0033 351/209 |
| 2017/0206691 A1 | 7/2017 | Harrises et al. | |
| 2019/0261599 A1* | 8/2019 | Bedell .................... | G01S 19/14 |
| 2020/0124845 A1* | 4/2020 | Smith .................... | G09G 5/363 |
| 2020/0215324 A1* | 7/2020 | Mantovani ............. | A61B 5/112 |

OTHER PUBLICATIONS

Harvey, A., Vickers, J. N., Snelgrove, R., Scott, M. F., & Morrison, S. (2014). Expert surgeon's quiet eye and slowing down: expertise differences in performance and quiet eye duration during identification and dissection of the recurrent laryngeal nerve. The American Journal of Surgery, 207(2), 187-193.

Klostermann, A. W., Panchuk, D., & Farrow, D. (2018). Perception-action coupling in complex game play: exploring the Quiet Eye in contested basketball jump shots. Journal of Sports Sciences, 36(9), 1054-1060.

Mann, D. T. Y., Williams, A. M., Ward, P., & Janelle, C. M. (2007). Perceptual-cognitive expertise in sport: a meta-analysis. Journal of Sport & Exercise Psychology, 29, 457-478.

Miles, C. A. L., Wood, G., Vine, S. J., Vickers, J. N., & Wilson, M. R. (2015). Quiet eye training facilitates visuomotor coordination in children with developmental coordination disorder. Research in Developmental Disabilities, 40, 31-41.

Panchuk, D., & Vickers, J. N. (2006). Gaze behaviours of goaltenders under spatial-temporal constraints. Human Movement Science, 25, 733-752.

Panchuk, D., & Vickers, J. N. (2011). Effect of narrowing the base of support on the gait, gaze and quiet eye of elite ballet dancers and controls. Cognitive Processing, 12, 267-276.

Panchuk, D., Farrow, D., & Meyer, T. (2014). How can novel training aids be used to induce acute changes in gaze behaviour? Journal of Sports Sciences 32(12), 1196-1201.

Reilly, T., Williams, A. M., Nevill, A. & Franks, A. (2000). A multidisciplinary approach to talent identification in soccer, Journal of Sports Sciences, 18(9), 695-702.

Vickers, J. N. (1996). Visual control when aiming at a far target. Journal of Experimental Psychology: Human Perception and Performance, 22(2), 342-54.

Vickers, J. N., & Lewinski, W. (2012). Performing under pressure: Gaze control, decision making and shooting performance of elite and rookie police officers. Human Movement Science, 31(1), 101-117.

* cited by examiner

First-person Tracking System
102

Eye Tracking Device
104

User-view camera
106

Third-person Tracking System
108

External camera
110

Other camera(s)
112

Computer System
114

Processor(s)
116

Memory
118

Automated Eye Tracker and Movement Assessor
120

130

102

132

134

108

114

150

Computer User Tracking System
152

Eye Tracking Device
152

Screen Capture
154

Third-person Tracking System
108

External camera
110

Other camera(s)
112

Computer System
114

Processor(s)
116

Memory
118

Automated Eye Tracker and Movement Assessor
120

AUTOMATED EYE TRACKING ASSESSMENT SOLUTION FOR SKILL DEVELOPMENT

PRIORITY CLAIM

This application claims the benefit of U.S. Provisional Patent Application Ser. No. 62/132,339 filed Dec. 30, 2020, the disclosure of which is incorporated herein by reference in its entirety.

TECHNICAL FIELD

This specification relates generally to eye tracking and movement tracking systems and more particularly to eye tracking and movement tracking systems configured for automated assessment for skill development.

BACKGROUND

Perceptual-motor skills play a critical role in the development of expertise, and eye tracking, specifically, has demonstrated efficacy for skill acquisition and training in sport, emergency medicine and military/law enforcement. That is because skilled performance is not only a product of a performer's physical capabilities, but is also underpinned by the development of highly specialized and specific perceptual-cognitive abilities. In sport performance, specifically, there is evidence of less variability in physical capabilities (e.g., agility, speed) and more refined sport-specific perceptual-cognitive skills (e.g., anticipation) as expertise increases (Reilly et al., 2000).

Different high-performance tasks (e.g., sport, eSport, medical, military) place a variety of skill demands on performers. Eye tracking provides insight into the mental processes that underpin these performances. By understanding what performers look at during skilled performance we can determine what sources of information are relevant and how they contribute to the development of expertise. Fixations (i.e., holding the eyes steady on a location), pursuit tracking (i.e., the eyes following a moving object), and saccades (i.e., fast eye movements that link fixations) are the most commonly studied eye movement variables. In their influential meta-analysis, Mann et al. (2007) noted that elite performers were faster and more accurate to perceive perceptual cues and that they used visual behaviors that were systematically different from lesser-skilled performers (i.e., fewer fixations, longer duration fixations, longer quiet period). From their analysis, Quiet Eye (Vickers, 1996; 2007) was the only specific variable that distinguished between levels of expertise.

Quiet Eye is specified by the final visual fixation or tracking gaze on a specific location or object in the performance space that lasts for a minimum of 100 ms prior to the onset of the movement action (Vickers, 1996; 2007). Quiet Eye has been associated with higher levels of skill and performance in a myriad of performance activities—i.e., golf putting, stopping a hockey puck, or shooting a basketball in sport (Panchuk et al., 2014; Panchuk & Vickers, 2006; Klostermann et al., 2017), locomotion and balance (Panchuk & Vickers, 2011), precise surgical dissection in medicine (Harvey et al., 2014), rehabilitation of children with developmental coordination disorder (Miles et al., 2015), and decision making and subsequent inhibition or targeted firing of a firearm in law enforcement (Vickers & Lewinski, 2012). Importantly, Quiet Eye is also sensitive to psychological factors such as anxiety and arousal in these task contexts. Thus, Quiet Eye is a useful tool for identifying perceptual-cognitive inefficiencies and for providing insights to inform enhanced skill acquisition and decision making training. Quiet Eye assessments are one of the most prominent methods for characterizing these types of visual behaviors and providing a foundation for training. However, several barriers exist that limit the utility and widespread adoptability of eye tracking measurement technologies for Quiet Eye assessment in real-world performance contexts.

Accordingly, there exists a need for automated eye tracking assessment for skill development.

SUMMARY

This specification describes systems and methods for automated eye tracking assessment for skill development. In some examples, a system includes an eye tracking device (either a first-person tracking system comprising an eye tracking device and a user-view camera, or a desktop-based tracking system consisting of a remote eye tracking device and screen capture technology); an optional third-person tracking system comprising at least one (or multiple) external camera(s); and a computer system comprising one or more processors. The computer system is configured for receiving, while a user is performing a task, eye gaze data from the eye tracking device, a user-view video from the user-view camera or screen capture technology, and, in some examples, an external video of the user from the external camera. The computer system is configured for determining whether or not the user's gaze is fixated on or tracking a specific location or object in a performance space for a threshold amount of time prior to the onset of a movement or a performance action. The computer system is configured for determining a task performance outcome after the movement or performance action and providing feedback that is individualized to the user.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform, may be distributed across multiple devices or computing platforms, or may use cloud-based storage and/or processing.

DESCRIPTION

This specification describes systems and methods for automated eye tracking and performance assessment for skill development.

Eye gaze and Quiet Eye assessments are one of the most prominent methods for characterizing these types of visual behaviors, linking them to performance, and providing a foundation for training. However, several barriers exist that limit the utility and widespread adoptability of eye tracking measurement technologies for Quiet Eye assessment in real-world performance contexts.

Barriers to an Automated Eye Tracking Application

Figure 1A:
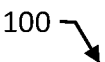
FIG. 1A is a block diagram of an example system for automated eye tracking and movement assessment for skill development of a user.
Figure 1A:
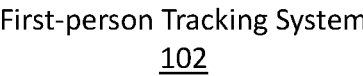

1. Situating eye movements and Quiet Eye within the actions of the learner and their performance environment.
2. Quickly and accurately identifying the phases of the motion to demarcate the eye movements and Quiet Eye period of attention.
3. Identification of the final fixation time and location prior to the beginning of the final movement phase to determine onset, duration and offset of the Quiet Eye.
4. Accurate indexing of task performance outcome.
5. Practical issues such as:
   High cost of equipment,
   Access to relevant expertise to collect, analyze, and interpret data and to support training interventions
   Turnaround time from data collection to reporting FIG. 1A is a block diagram of an example system 100 for automated eye tracking and movement assessment for skill development of a user. The system 100 can be used, for example, for quiet eye assessments of live athletes performing an athletic task such as shooting a basketball. The system 100 includes a first-person tracking system 102, a third-person tracking system 108, and a computer system 114 configured to receive images from the first-person tracking system 102 and the third-person tracking system 108.

The first-person tracking system 102 includes an eye tracking device 104 and a user-view camera 106. The first-person tracking system 102 can be implemented, for example, as eye tracking glasses configured to wirelessly to transmit to the computer system 114. Eye tracking glasses can include cameras trained on the user's eyes and a forward-facing camera for the user-view camera 106 that provides images of the user's view.

The third-person tracking system 108 includes at least one external camera 110 and, in some examples, one or more other cameras 112. The external camera 110 is movable and configured to be trained on the user and, depending on the application, to an object that the user is watching or another object in the user's environment.

The computer system 114 includes at least one processor 116 and memory 118 storing instructions for the processor 116. The computer system 114 can be a local system such as a laptop, desktop, or tablet; the computer system 114 can alternatively be implemented in a cloud computing system or in a hybrid manner with a cloud computing system. The computer system 114 includes an automated eye tracker and movement assessor 120 that is implemented using the processor 116.

The automated eye tracker 120 is configured for receiving, while the user is performing a task, eye gaze data from the eye tracking device 104, a user-view video from the user-view camera 106, and an external video of the user from the external camera 110. The automated eye tracker 120 is configured for determining the relationship between the user's movement performance and the eye gaze data, the user-view video, and the external video.

The automated eye tracker 120 is configured for determining whether or not the user's gaze fixed on a specific location in a performance space for at least a threshold amount of time prior to the onset of a movement action. The automated eye tracker 120 is configured for determining a task performance outcome after the movement or performance action. Determining the task performance outcome can include, for example, supplying the user-view video to a machine learning classifier trained on training data for the movement action.

The automated eye tracker 120 can be configured for outputting an assessment report based on whether or not the user's gaze fixed on the specific location, the duration the gaze is fixed on a location during the performance, and the task performance outcome. Outputting the assessment report can include, for example, displaying the assessment report on a display device of the computer system 114 or transmitting the assessment report to a remote computer system or device such as a mobile phone or tablet. The automated eye tracker 120 can be configured for repeatedly updating and outputting the assessment report as the user repeats the movement action, for example, outputting an assessment report each time the user shoots a basketball.

In some examples, the automated eye tracker 120 is configured for performing object detection using the user-view video or the external video to determine the task performance outcome. For example, the automated eye tracker 120 can detect a basketball in the user-view video or the external video to determine whether the basketball passed through a basketball net.

The automated eye tracker 120 can be configured for performing simultaneous localization and mapping (SLAM) using the user-view video to determine the task performance outcome. In some examples, the automated eye tracker 120 is configured for creating and storing an internal reconstruction of the performance space using the user-view video and the external video of the user.

In some examples, the automated eye tracker 120 is configured for performing markerless pose-estimation to determine movement phases of the user as the user performs the movement action. Determining whether or not the user's gaze fixed on a specific location in a performance space for at least a threshold amount of time prior to the onset of a movement action can include determining whether or not the user's gaze fixed on the specific location at a particular movement phase of the movement phases.

Figure 1B:
FIG. 1B illustrates an example application of the system for producing quiet eye assessments of a user shooting a basketball.
Figure 1B:
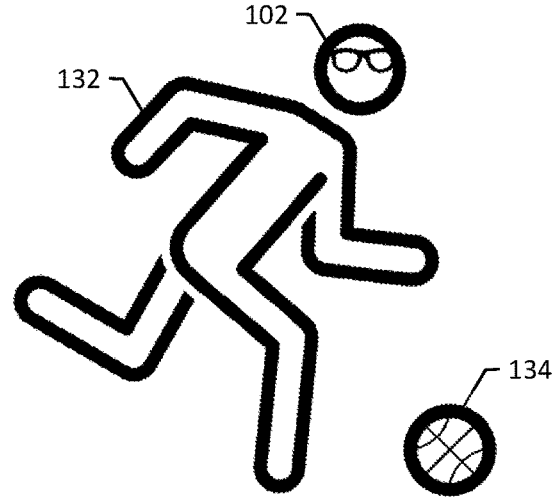
Figure 1B:
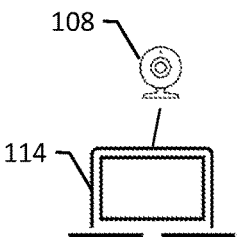

FIG. 1B illustrates an example application 130 of the system 100 for producing quiet eye assessments of a user 132 shooting a basketball 134. In general, the system 100 can be used for any appropriate performance task, and the example of shooting the basketball 134 is provided for purposes of illustration.

As shown in FIG. 1B, the user 132 wears eye tracking glasses as the first-person tracking system 102 while shooting the basketball 134. The computer system 114 is connected to the external camera 108 that is trained on the user 132. The external camera 108 can be a separate camera connected to the computer system 114 or a built-in camera such as the camera on a laptop, tablet, or mobile phone.

Figure 1C:
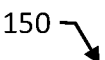
FIG. 1C is a block diagram of an example system for automated eye tracking and movement assessment for skill development of a user.

FIG. 1C is a block diagram of an example system 150 for automated eye tracking and movement assessment for skill development of a user. The system 100 can be used, for example, for quiet eye assessments of computer users such as players of eSports games or other computer users performing tasks.

The system 100 includes a computer user tracking system 152, a third-person tracking system 108, and a computer system 114 configured to receive images from the computer user tracking system 152 and the third-person tracking system 108. The computer user tracking system 102 includes an eye tracking device 152 and a screen image capturer 154. The eye tracking device 152 can be a remote eye tracking device, for example, a camera facing the user from the direction of a display screen.

The automated eye tracker and movement assessor 120 can be configured as described above with reference to FIG. 1A with some modifications. The automated eye tracker 120 is configured for receiving, while the user is performing a task on the computer system 114 or another computer system, eye gaze data from the eye tracking device 152, a screen-capture video from the screen image capturer 154, and an external video of the user from the external camera 110.

The automated eye tracker 120 is configured for determining the relationship between the user's movement performance and the eye gaze data, the screen capture video, and the external video of the user. The automated eye tracker 120 is configured for determining whether or not the user's gaze fixed on a specific location in a performance space for at least a threshold amount of time prior to the onset of a movement action. The automated eye tracker 120 is configured for determining a task performance outcome after the movement or performance action.

The automated eye tracker 120 can be configured for performing object detection using the screen capture video to determine the task performance outcome. The automated eye tracker 120 can be configured for performing simultaneous localization and mapping (SLAM) using the screen capture video to determine the task performance outcome.

The automated eye tracker 120 can be configured for creating and storing an internal reconstruction of the performance space using the screen capture video and the external video of the user. The automated eye tracker 120 can be configured for determining the task performance outcome comprises supplying the screen capture video to a machine learning classifier trained on training data for the movement action.

Initial Targeted Applications

Skilled performers and teams are constantly looking to separate themselves from their competition and, traditionally, the focus has been on physical performance areas (e.g., strength, power and endurance). However, more recently there has been a race toward understanding how psychological and perceptual areas can further enhance the competitive edge.

Eye movement training augments this focus while pushing the training into alignment with contemporary research on skill development. There are, however, significant knowledge barriers that prevent organizations from leveraging eye movement training. Specifically, there is a need for a system-level solution to precisely target perceptual inefficiencies. The systems and methods described in this document can capitalize on the growing interest in psychological and perceptual skill development and the booming performance technology market by implementing an end-to-end eye- and movement-integrated tracking solution for skill development in basketball, other performance tasks, and eSports.

1. Description of Basketball Application

In basketball, specifically, shooting the ball is critical to success. At the NBA-level, the number of 3-point attempts has increased by 62.5% since 2013. The increased emphasis on shooting means that good shooters are at a premium and teams are willing to go to great lengths to develop shooting skills. NBA teams employ specialist shooting coaches and invest in shot tracking technology that focuses on the refinement of shooting technique.

The systems described in this document can be implemented for basketball and can be useful to simplify data collection, automate the analysis process, provide near-real-time performance insights, and deliver individualized and actionable feedback to drive training. The system can allow novice users to gather performance insights while minimizing the reliance on external expertise. Ultimately, the system will allow athletes to improve performance by providing individualized insight into how eye movements underpin successful shooting skill and other skills.

Figure 1D:
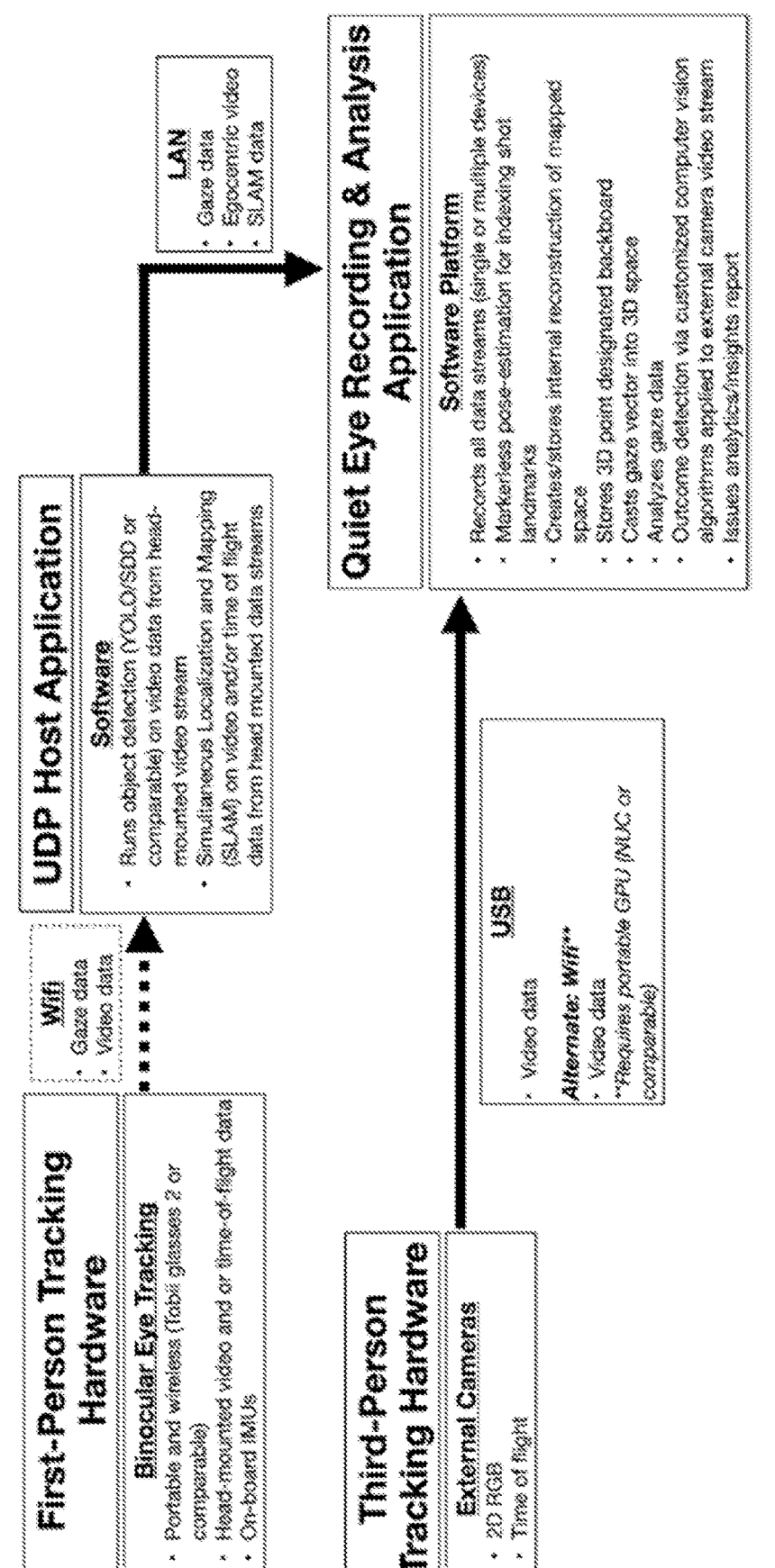
FIG. 1D is a schematic of an example quiet eye assessment platform.

FIG. 1D is a schematic of an example quiet eye assessment platform integrating first- and third-person tracking hardware via an example recording and analysis software platform to generate real-time automated Quiet Eye assessments.

The platform leverages portable binocular eye tracking (e.g., Tobii Glasses 3) with an integrated scene camera, time of flight sensors and gyroscope for indexing egocentric eye gaze behavior. It also integrates video-based tracking of movements in conjunction with computer vision algorithms for markerless pose estimation to determine movement phases. This is combined with object detection machine learning algorithms for semantic indexing of objects in both the third- and first-person video data streams and simultaneous localization and mapping (SLAM) data from head mounted data streams to localize the eye gaze target location (i.e., basketball rim and backboard). The combination of these data streams situates quiet eye within the basketball shooting actions of the athlete, and provides a solution for Barrier 1.

The automated and markerless pose-estimation allows the system to record performer kinematics and is capable of real-time collection at up to, for example, 90 frames per second. This allows for the demarcation of each phase of the shooting movement—the start is typically the point where the player has lifted the ball to their chest and the elbow begins to extend until the ball leaves the player's hand. This solves Barrier 2.

The SLAM data is combined with eye gaze data to index fixation points in real-world coordinates, and when combined with object detection machine learning algorithms, enables the automatic characterization of the time (i.e., relative to the shooting movement phase) and location (i.e., specific coordinates on the hoop) of fixation to index Quiet Eye in real-time. This solves Barrier 3.

Finally, customized machine learning algorithms, will be used to identify a performance outcome, solving Barrier 4.

Quiet Eye traditionally corresponds to fixations within 3 degrees of visual angle (Vickers, 2007). When considering a free throw (i.e., 5 m from the basketball hoop), this would correspond to a diameter of approximately 20 cm at the front of the hoop. Initial implementations would identify the location of the hoop, via SLAM, and use this distance as the buffer around that space. These individual solutions are integrated and configured in a manner that removes the need for extensive training and expertise, significantly reduces turnaround time, and improves the accessibility of eye tracking technology to a wider audience of users. This solves Barrier 5.

Figure 2:
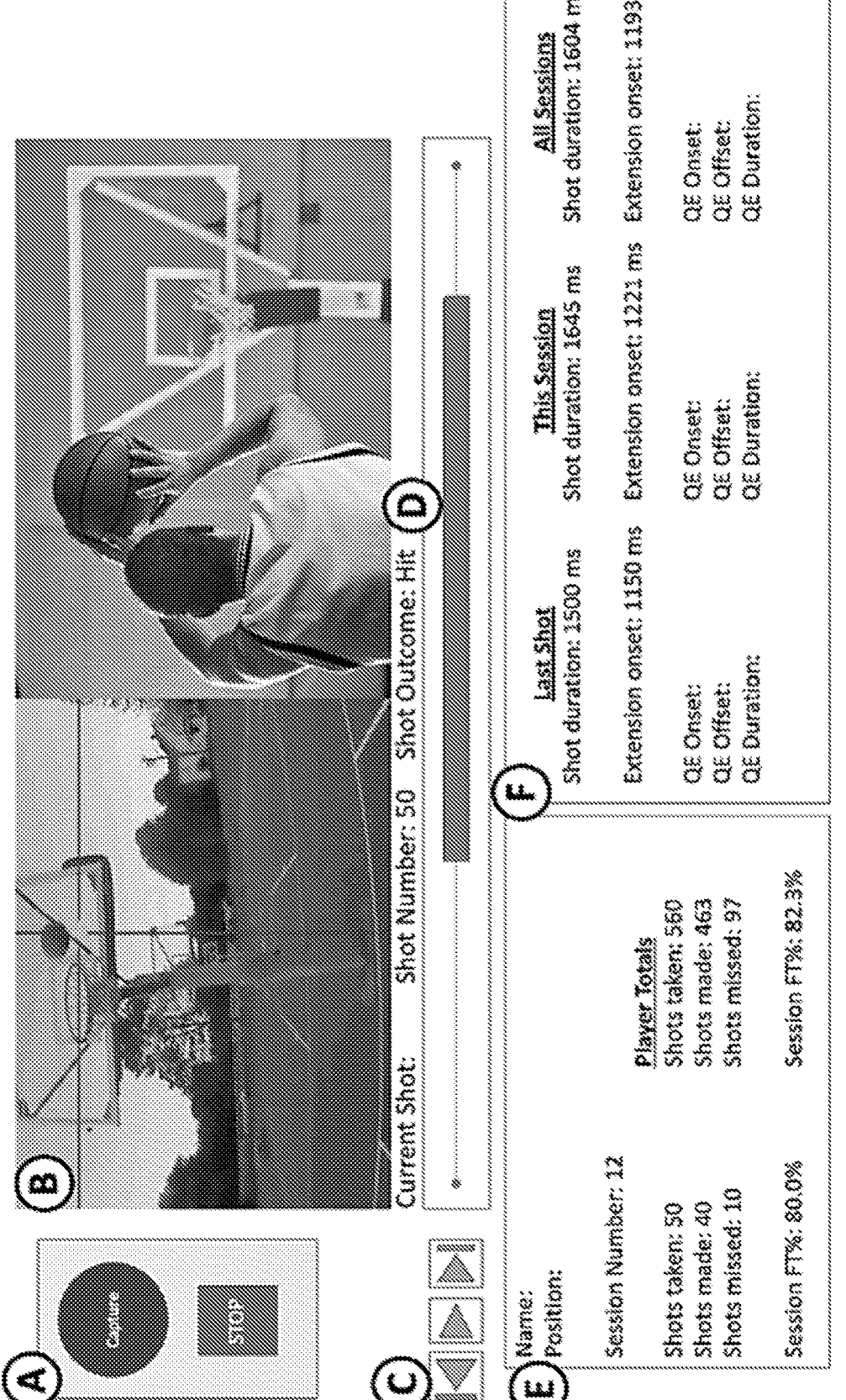
FIG. 2 shows an example of a potential real-time visualization software interface.

FIG. 2 shows an example of a potential real-time visualization software interface for use with the Quiet Eye Platform. (A) Controls to start and stop video capture. (B) The synchronized gaze and external camera videos. This would display the last shot that was taken and be trimmed to the start of the shot and the outcome of the shot. Comparison mode would enable two clips to be run side-by-side or stacked for training purposes. (C) Playback controls to allow start, stop, slow-motion, and frame-by-frame control of the video. (D) A graphical representation of the key events during the shot: the start of arm extension, ball release, and outcome. A visual graph of the QE would be situated relative to the start of the trial. (E) Demographic information as well as performance results. Information on the specific session and player's on-going performance tally. (F) QE data section. Key metrics include: last shot, the session and total. The ability to compare performance outcomes and settings can change to show graphs of key metrics from shot-to-shot, within the session, or across a number of historical sessions. The key metrics can also be incorporated into backend analytic insights report.

Figure 3:
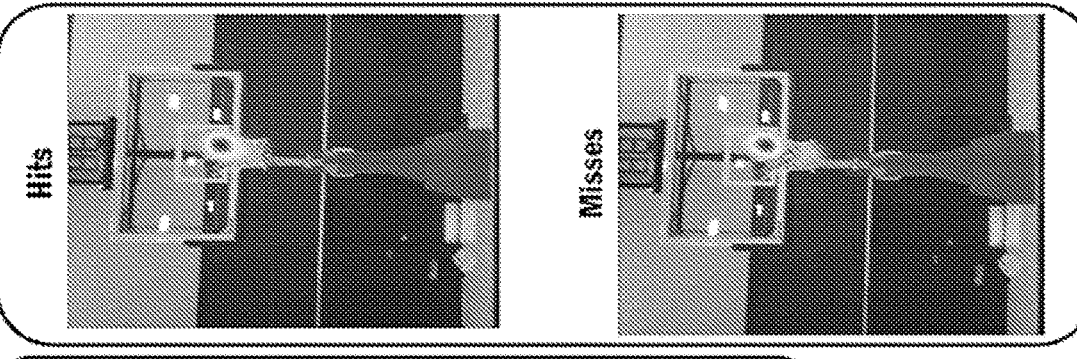
FIG. 3 provides a sample analytics and insights performance report.
Figure 3:
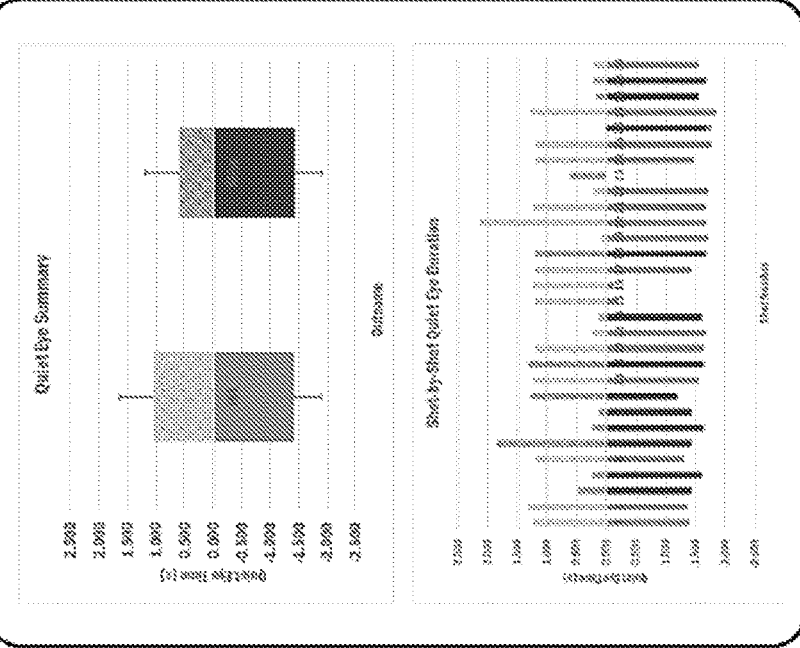
Figure 3:
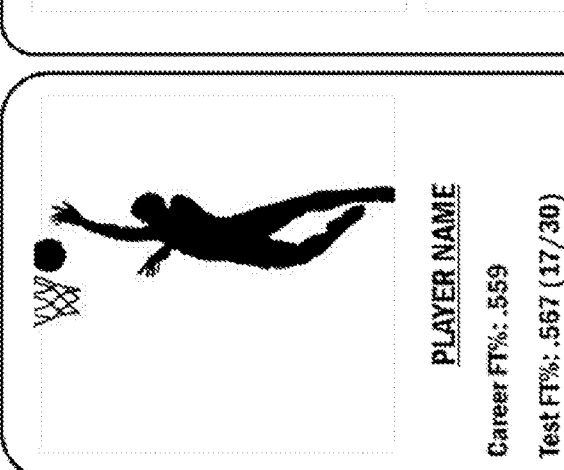

FIG. 3 provides a sample analytics and insights performance report. These reports can be generated automatically, with individualized benchmarks of performance, comparisons across multiple attempts and sessions with longitudinal tracking over time. Analytics include, but are not limited to, summary measures of eye gaze patterns, kinematic variables (including joint and segment angles, rotations and orientations) and time series of these patterns to provide a behavioral profile over the time course of each shot attempt or summarized across a series of shot attempts. In addition, the multi-stream video data can be saved for each shot attempt and can be played back for offline feedback training. This can include viewing multiple clips of different shots (potentially from different sessions) side-by-side.

Other Features

Additional features can optionally be integrated into the platform. These can include:

The identification and localization of additional objects in scene, custom object detection and SLAM algorithms to enable more in-depth analyses around scanning strategies, for example.

The utilization of machine learning algorithms to automatically classify (a) specific objects and locations on specific objects to contextualize the eye gaze within a given environment, and (b) the identification of kinematic landmarks relative to the start and stop of a given movement action that will be used to automate the extraction of behavioral epochs for the computation of action-specific eye gaze and movement patterns.

As data sets are built, bandwidths of performance will be established-based on performance norms and individual performance data—that can be used as guidelines to help players of all abilities refine and hone behavior. In effect automating the training process and providing players with performance benchmarks and tracking. In addition, eXplainable Artificial Intelligence (XAI) can be utilized to semantically identify patterns of behavior as measured by this system that link to competitive outcomes. These semantic rules will serve to further refine performance feedback and automate the training process.

Integration with other performance tracking software and/or hardware and data metrics.

Development of additional modules and/or peripherals to provide additional support for players. For example, virtual-, augmented- or mixed-reality applications that create more game-like scenarios (creation of a virtual stadium or augmented release points, shot trajectories or visual targets in mixed-reality).

2. Description of eSports Application

Similar to traditional sports, eSports, and first-person shooters specifically, require athletes to locate targets and respond quickly and accurately for successful outcomes. Eye tracking data can be incredibly valuable to eSport athletes but there are no conventional platforms that provide insight into the relationship between eye movements and performance.

The automated eye tracking system for eSports simplifies data collection, automates the analysis process, provides near-real-time performance insights, and delivers individualized and actionable feedback to drive training. It can provide players with a report of their current performance, identify metrics that underpin success, benchmark performance over time, and identify opportunities for improvement.

The platform leverages screen-mounted eye and head tracking (e.g., Tobii Eye Tracker 5) with screen capture and peripheral (e.g., mouse and keyboard) logging technology. It integrates these data streams to localize the eye gaze target location. This will be integrated with either directly accessible game data or, alternatively, image recognition algorithms to generate data of game objects and events from time step to time step. The combination of these data streams situates eye movement behaviors within the game-play actions of the user and provides a solution for Barrier 1.

The automated and markerless pose-estimation allows the system to take two-dimensional video recordings and index performer kinematics and facial movements, in real-time and up to 90 frames per second. This allows for integration of eye data, peripheral inputs, postures and emotion tracking during a specific action sequence and throughout the course of play.

Customized machine learning algorithms, when necessary, will be used to identify a performance outcome.

Much like in ball sports, Quiet Eye fixations necessitate a diameter of approximately 3.0 cm transformed relative to the athlete's distance from the screen. Initial implementations would identify the location of the target to which the athlete is aiming, via readily available coordinate data of game objects, and use this distance as the buffer around that space. These individual solutions are integrated and configured in a manner that removes the need for extensive training and expertise, significantly reduces turnaround time, and improves the accessibility of eye tracking technology to a wider audience of users.

Analytics and insights performance reports can be generated automatically, with individualized benchmarks of performance, comparisons across multiple attempts and sessions with longitudinal tracking over time. Analytics include, but are not limited to, summary measures of eye gaze patterns, measures deriving from peripheral input data including response times, shot accuracy, input variability, and actions-per-minute (APM), kinematic variables (including head, neck and trunk angles, rotations and orientations) and time series of all of these behaviors to provide a behavioral profile over the time course of each action sequence or summarized across a series of action sequences. In addition, the multi-stream video data can be saved for specific events and can be played back for offline feedback training. This can include viewing multiple clips of different events (potentially from different sessions) side-by-side.

Other Features

Additional features can optionally be integrated. These can include:

The utilization of machine learning algorithms to automatically classify (a) specific action sequences and behaviors to further contextualize the eye gaze within a given scenario or game environment, and (b) the identification of behavioral landmarks relative to the start and stop of a given action sequence that will be used to automate the extraction of behavioral epochs for the computation of action-specific eye gaze, peripheral input sequences and movement patterns.

As data sets are built, bandwidths of performance will be established-based on performance norms and individual performance data—that can be used as guidelines to help players of all abilities refine and hone behavior. In effect automating the training process and providing players with performance benchmarks and tracking. XAI can be utilized to semantically identify patterns of behavior as measured by this system that link to competitive outcomes. These semantic results will both further refine performance feedback and inform the automated training process.

Integration with other performance tracking software and/or hardware and data metrics.

Figure 4:
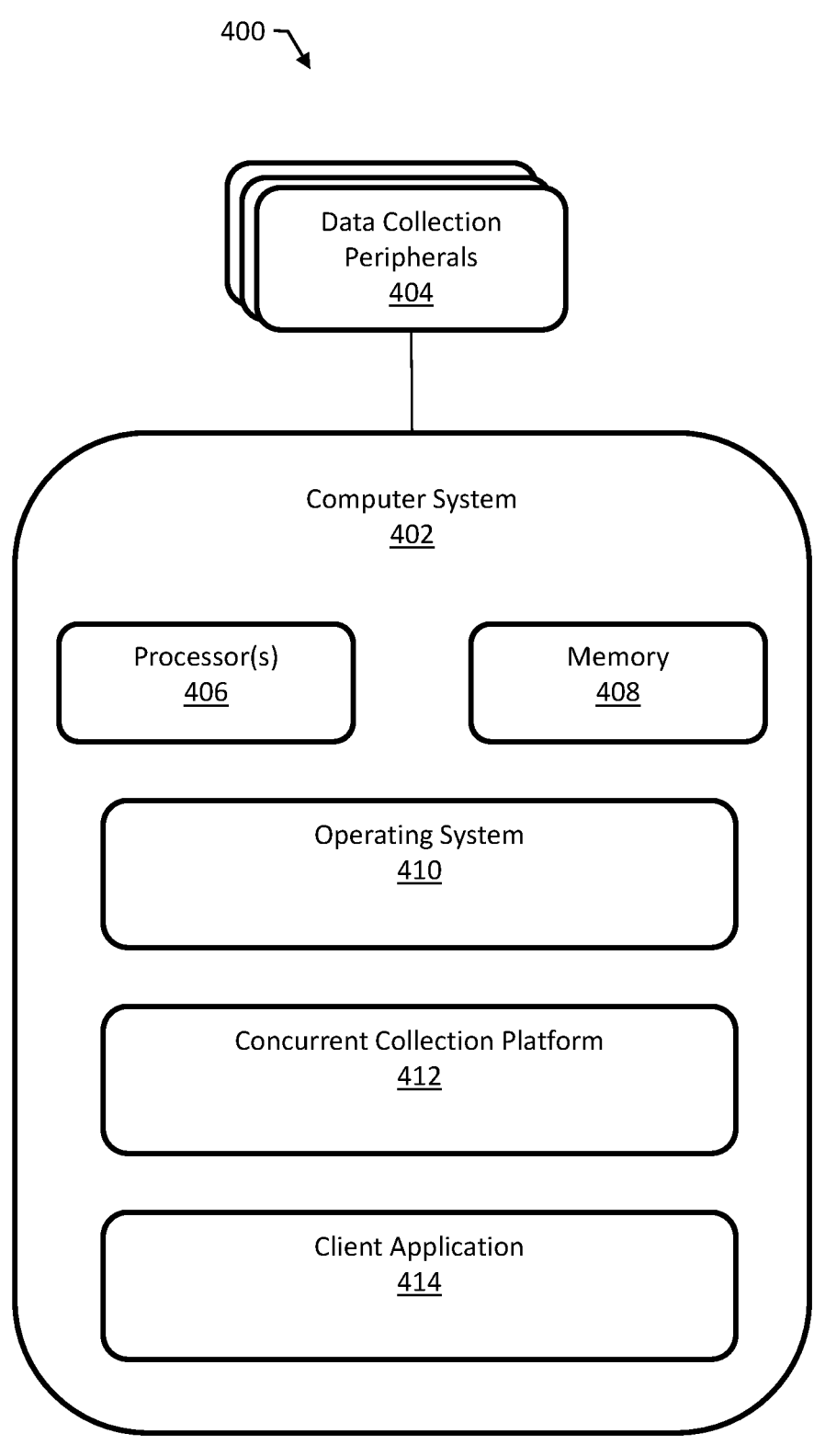
FIG. 4 is a block diagram of an example system for automated data collection and synchronization for movement assessment applications.

FIG. 4 is a block diagram of an example system 400 for automated data collection and synchronization for movement assessment applications. The system 400 includes a computer system 402 configured for collecting data from a variety of data collection peripherals 404.

The data collection peripherals 404 can include one or more of: a camera, an electromyography (EMG) sensor, a wristband with an accelerometer and/or other physiological sensors, eye tracking glasses, pressure insoles, inertial measurement units (IMUs), virtual reality headsets, and the like.

The computer system 402 includes at least one processor 406 and memory 408 storing instructions for the processor 406. The computer system 402 executes an operating system 410. The computer system 402 includes a concurrent collection platform 412 that supports the concurrent collection of synchronized data streams from the data collection peripherals 404.

The computer system 402 includes a client application 414 which uses the platform 412 to perform one or more movement assessment applications. For example, the client application 414 can perform a quiet eye assessment as described above with reference to FIGS. 1-3. In general, the client application 414 can perform any appropriate type of movement assessment application that involves the collection of concurrent data streams from the data collection peripherals 404.

The platform 412 can be useful to obfuscate from a developer of the client application 414 the development steps necessary to collection, visualization, and analysis across common devices. The platform 412 is configured for automated collection and processing for a variety of projects and can operate as a foundation for additional software development. The platform 412 can be used as a standalone program or as a background process to the client application 414. The platform 412 can be implemented locally or on a cloud computing system. In some examples, the platform 412 is implemented on Unity.

The platform 412 can be configured to support one or more of the following features:

1. Devices—connection and control of external data collection peripherals, hidden behind a common, simplified interface. Building blocks for extending into new devices with similar requirements.
2. Recording—Centralized control of recording features of connected devices. Devices can be yoked to central control, or independently collected. Samples are centrally time stamped and saved in a single file, for later analysis either with the platform 412 or the client application 414.
3. Visualization—A library of visualization tools for data within-trial, trial-to-trial, session-to-session, etc. Includes a time-synchronized playback tool for 2D video, kinematics, and peripheral data, as well as graphing tools.
4. Analysis—A suite of tools for manual data cleanup and custom event marking, along with a click-and-drag interface for creating data analysis pipelines from a library of common metrics, filters, and operations to create custom reports. Includes tools for machine-learning-based video analysis.
5. Server—A LAN or DNS server to allow the client application 414 to control the platform 412 and receive either raw or preprocessed data streams back to drive real-time collection and/or feedback applications.
6. Storage—A fully-featured online database solution for organizing, querying, reporting and long term storage remotely without need for local storage devices. A thin-client for streaming access to data from less-powerful devices.

The data collection peripherals 404 can connect to the computer system 402 in myriad ways, as determined by the hardware and software choices of the manufacturer. The platform 412 can simplify the process of using a variety of connected devices by hiding their idiosyncrasies behind a common PeripheralInterface.

The PeripheralInferface is an abstract class from which individual device implementations can be derived if the platform 412 is implemented using Unity, this class extends MonoBehaviour, so it can be a custom Unity Component. It can include the following abstract methods:

Enable/Disable
Connect/Disconnect
Stream
Record/StopRecording
Save

It can additionally contain the following Events:

OnInterfaceStatusChanged
OnDeviceStatusChanged
OnDeviceMessageReceived
OnSampleReceived
OnRecordingComplete The Unity implementation of the platform 412 can also include the abstract MonoBehaviour DeviceMenu, which contains public methods for device-specific GUI functionality, and abstract class DeviceFrame, which includes fields for device data, frame indexing, timestamps, and serialization (i.e. what a frame of data looks like and how to parse/store it).

A device is supported if the PeripheralInferface, DeviceMenu, and DeviceFrame classes are extended in a new class—i.e. TrignoInterface, TrignoDeviceMenu, and TrignoFrame—and these components are added to a scene with correct references. Classes extending PeripheralInterface must implement all abstract methods and invoke all Events where appropriate. Classes extending DeviceMenu need not override any methods, but may add new ones where appropriate.

While hidden from the end-user, in order to support a variety of devices, numerous types of connections can be supported by the platform 412. Individual devices require implementation of their respective API or SDK in their PeripheralInterface, but these connection types serve as common building blocks. For example, the platform 412 can support connection types such as USB, TCP/UDP over LAN, REST (HTTP), Websocket, RTSP, and Bluetooth.

The platform 412 can simultaneously stream and record any connected and yoked device (as configured in the Device Menu). Frames from these devices are timestamped and indexed, then serialized to a single file, which can be, for example, structured JSON containing the following fields:

Video Data:
    frameCount
    duration
    framerate
    videoFiles
    poseData
Other Devices:
    peripheralData
Derived Data:
    events
    timeSeriesData
    summaryData As can be seen above, video data takes precedence, and is the signal to which other devices, events, and time series metrics are synchronized.

In the event there is no video data, such as recording from a single unyoked device, the data can be stored either as ar .csv file or custom format, where the signal with the highest sample rate takes precedence.

When video recording, the platform 412 can provide a live view in addition to saving data. The video data can be saved directly or by generating, for example, a .rec binary file with the bytes of data of each frame together.

The platform 412 can be configured for both live visualization and playback device data streams. For example, the platform 412 can offer one or more of the following features: Timeline View and Scrubbing Controls; 2D Video Views; 2D Kinematics Views; 3D Kinematics Views; Animated 3D model view; Real-time Oscilloscop; Gaze Overlay; Charts (line graphs, histograms, pie charts, etc.); Device messages and user events; and Computer Vision—Bounding Boxes, Segmentation Masks.

Analyzing a Kapture can include three steps:
    Preprocessing, in which the data is cleaned and formatted
    Processing, in which the data is run through a series of transformations using a user-defined pipeline
    Reporting, in which the data is presented for consumption by either a human analyst or machine-learning algorithm.
    These steps can be conducted outside of the platform 412, using a wide variety of tools depending on use case, or within the platform 412 such that all elements of the analysis pipeline are within the platform 412. This can be accomplished, for example, through a suite of manual tools for experimentation, a library of standard and customizable processing functions, and integrations with common external processes and machine-learning models.

The platform 412 can be configured with one or more of the following features:

Preprocessing:
    Format parsers: structured json, csv, tsv, binary files of known formats
    Manual trajectory cleanup tools: Deletion, Interpolation, splining, smoothing of waveforms, clipping
    Automated trajectory cleanup tools: Filters such as butterworth, envelope, high-pass, low-pass etc., with recommended presets for various data sources.
("Trajectory" here meaning any form of continuous time-series data: kinematics, emg, gaze, etc.).
    Event marking—placing of discrete markers at a time point, with user-defined descriptive IDs.
    Automated Event marking—based on user-defined feature extraction on a particular waveform (ex-marking minimum vertical ground reaction force during a jumping task as "Flight Phase Start")
Processing:
    Processing pipeline construct—A click-and-drag interface for adding, removing, and parameterizing processing functions in order. Users will have access to a library of functions common to data and motion science with which to build their pipeline. Custom pipelines will be saved as project-external files for re-use.
Reporting:
    In addition to exporting time series data in a user-preferred format (csv, etc. with ability to select exported fields), users will be able to define custom reporting formats including tables and graphic representations built on the Visualization namespace.

Users can batch process files without manual intervention.—As enabled by, e.g., the cloud, users will be able to define additional analysis pipelines beyond the level of an individual trial to generate additional reports, including, for example, Trial, Subject and Group levels of analysis. Users will be able to define custom groups through a GUI obfuscating a Query backend.

In examples where the platform 412 is implemented as a server, the platform 412 can be implemented with a server mode and an API. Remote platform instances on the same local network can receive remote commands that parallel the PeripheralInterface abstract methods—Connect, Stream, Record, Save. Additional commands to specify Trial Duration, Subject ID, and Trial Name are also available through as simple text-based API. The platform 412 on a server can use, e.g., UDP.

With cloud integration, the cloud can serve as an intermediary: A controlling application can control a collection device by accessing sending a request to a remote endpoint; the collection device will stream data directly to the cloud; the controlling application will be able to receive preprocessed data by streaming from a remote compute instance, allowing near-real-time access to usable data without need for direct physical connection or local processing power. In examples where such remote connectivity is unnecessary, the platform 412 can be executed in headless server mode, as a background process accessible via, e.g., localhost.

Long-term storage of large quantities of data, particularly video data, can be ported to the cloud, to alleviate the bottleneck of local storage capacity. Video data can be de-identified via, e.g., facial blurring or censoring, compressed, and then sent to cloud storage. Derived data can be held in a database to be queried. Reports and playback can be accessible either via a web portal, or a locally-installed thin client.

Figure 5:
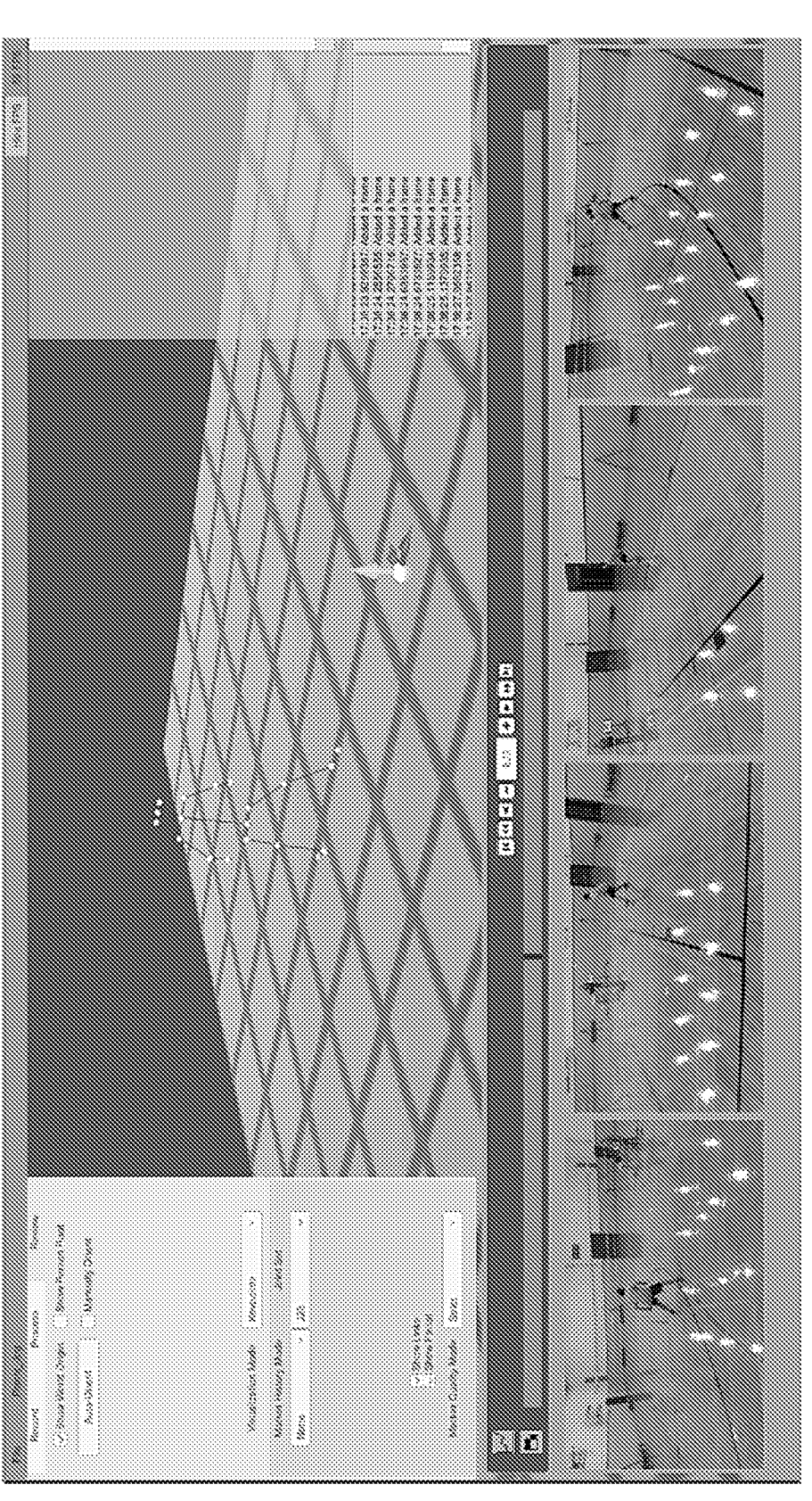
FIG. 5 is a screenshot of an example camera view that can be provided by the platform.
Figure 6:
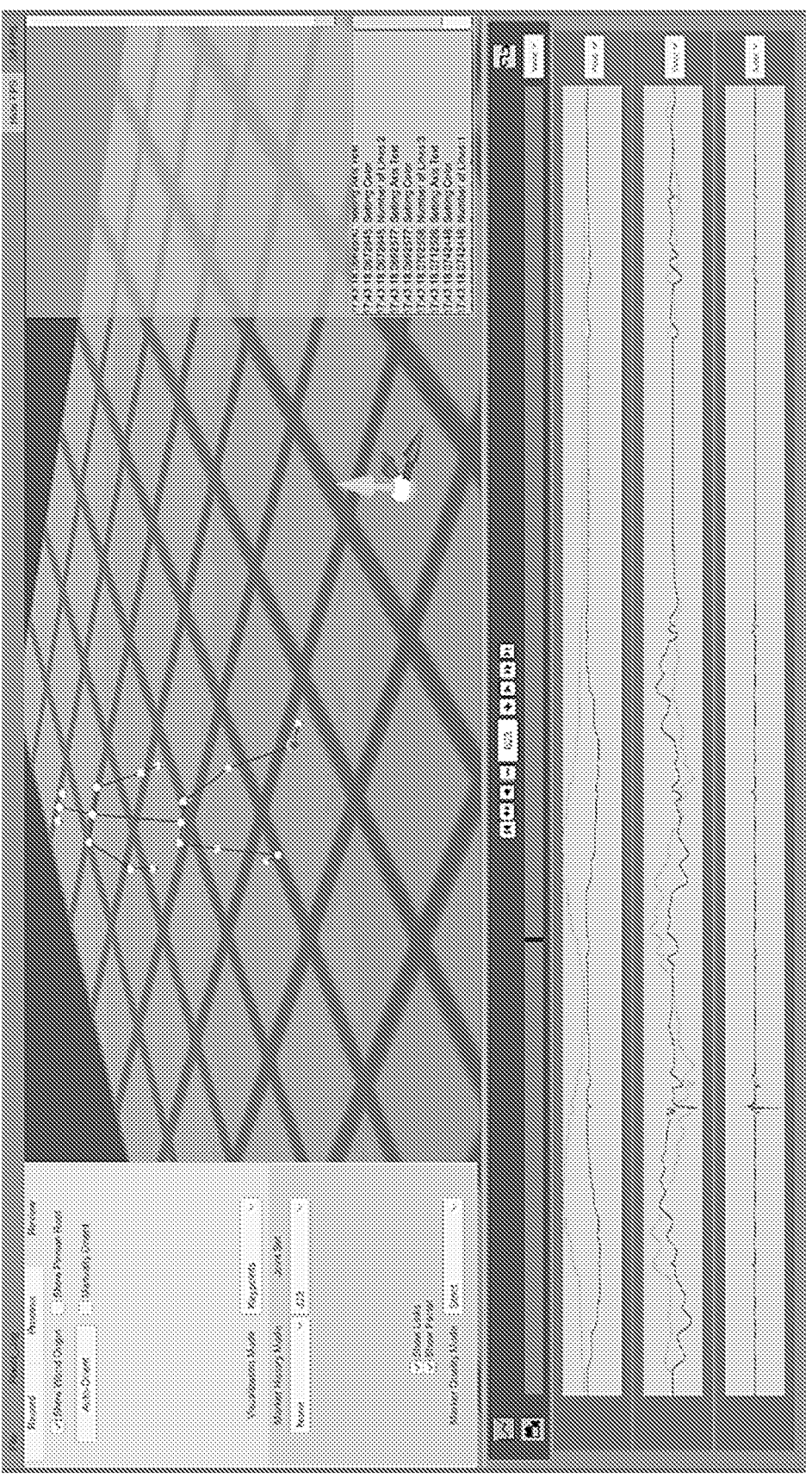
FIG. 6 is a screenshot of an example trajectory view that can be provided by the platform.

FIG. 5 is a screenshot of an example camera view that can be provided by the platform 412. FIG. 6 is a screenshot of an example trajectory view that can be provided by the platform 412.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

Harvey, A., Vickers, J. N., Snelgrove, R., Scott, M. F., & Morrison, S. (2014). Expert surgeon's quiet eye and slowing down: expertise differences in performance and quiet eye duration during identification and dissection of the recurrent laryngeal nerve. *The American Journal of Surgery,* 207(2), 187-193.

Klostermann, A. W., Panchuk, D., & Farrow, D. (2018). Perception-action coupling in complex game play: exploring the Quiet Eye in contested basketball jump shots. *Journal of Sports Sciences,* 36(9), 1054-1060.

Mann, D. T. Y., Williams, A. M., Ward, P., & Janelle, C. M. (2007). Perceptual-cognitive expertise in sport: a meta-analysis. *Journal of Sport & Exercise Psychology,* 29, 457-478.

Miles, C. A. L., Wood, G., Vine, S. J., Vickers, J. N., & Wilson, M. R. (2015). Quiet eye training facilitates visuo-motor coordination in children with developmental coordination disorder. *Research in Developmental Disabilities,* 40, 31-41.

Panchuk, D., Farrow, D., & Meyer, T. (2014). How can novel training aids be used to induce acute changes in gaze behaviour? *Journal of Sports Sciences* 32(12), 1196-1201.

Panchuk, D., & Vickers, J. N. (2006). Gaze behaviours of goaltenders under spatial-temporal constraints. *Human Movement Science,* 25, 733-752.

Panchuk, D., & Vickers, J. N. (2011). Effect of narrowing the base of support on the gait, gaze and quiet eye of elite ballet dancers and controls. *Cognitive Processing,* 12, 267-276.

Reilly, T., Williams, A. M., Nevill, A. & Franks, A. (2000). A multidisciplinary approach to talent identification in soccer, *Journal of Sports Sciences,* 18(9), 695-702.

Vickers, J. N. (1996). Visual control when aiming at a far target. *Journal of Experimental Psychology: Human Perception and Performance,* 22(2), 342-54.

Vickers, J. N. (2007). *Perception, Cognition, and Decision Training: The Quiet Eye in Action.* Champaign, IL: Human Kinetics.

Vickers, J. N., & Lewinski, W. (2012). Performing under pressure: Gaze control, decision making and shooting performance of elite and rookie police officers. *Human Movement Science,* 31(1), 101-117.

What is claimed is:

1. A system for automated eye tracking and movement assessment for skill development, the system comprising:
  a first-person tracking system comprising an eye tracking device and a user-view camera;
  a third-person tracking system comprising at least one external camera; and
  a computer system comprising one or more processors and configured for:
    receiving, while a user is performing a sports or esports task, eye gaze data from the eye tracking device, a user-view video from the user-view camera, and an external video of the user from the external camera;
    determining whether or not the user's gaze fixes on a specific location in a performance space for at least a threshold amount of time prior to the onset of a movement action; and
    determining, using simultaneous localization and mapping (SLAM) of the user-view video, a performance outcome of the sports or esports task after the movement action;
    performing markerless pose-estimation to determine movement phases of the user as the user performs the movement action;
    generating, in real time, quiet eye index data that indicates a plurality of quiet eye times for a plurality of repetitions of the movement action, wherein the movement action comprises a movement action of the user while the user is performing the sports or esports task; and
    visually displaying a graphical representation of the plurality of quiet eye times for the plurality of repetitions of the movement action.

2. The system of claim 1, wherein the first-person tracking system comprises eye tracking glasses configured to wirelessly transmit to the computer system.

3. The system of claim 1, wherein the computer system is configured for performing object detection using one or both of the user-view and external video to determine the performance outcome of the sports or esports task.

4. The system of claim 1, wherein the computer system is configured for creating and storing an internal reconstruction of the performance space using the user-view video and the external video of the user.

5. The system of claim 1, wherein the computer system is configured for outputting an assessment report based on whether or not the user's gaze fixes on the specific location, a duration that the gaze fixes on a location during the performance, and the task performance outcome of the sports or esports task.

6. The system of claim 5, wherein the computer system is configured for repeatedly updating and outputting the assessment report as the user repeats the movement action.

7. The system of claim 1, wherein determining whether or not the user's gaze fixes on a specific location in a performance space for at least a threshold amount of time prior to the onset of a movement action comprises determining whether or not the user's gaze fixes on the specific location at a particular movement phase of the movement phases.

8. The system of claim 1, wherein determining the performance outcome of the sports or esports task comprises supplying the user-view video to a machine learning classifier trained on training data for the movement action of the user while the user is performing a sports or esports task.

9. A method for automated eye tracking assessment for skill development, the method comprising:

receiving, while a user is performing a sports or esports task, eye gaze data from an eye tracking device, a user-view video from a user-view camera or screen capture technology, and an external video of the user from an external camera;

determining whether or not the user's gaze fixes on a specific location in a performance space for at least a threshold amount of time prior to the onset of a movement action;

determining, using simultaneous localization and mapping (SLAM) of the user-view video, a performance outcome of the sports or esports task after the movement action;

performing markerless pose-estimation to determine movement phases of the user as the user performs the movement action;

generating, in real time, quiet eye index data that indicates a plurality of quiet eye times for a plurality of repetitions of the movement action, wherein the movement action comprises a movement action of the user while the user is performing the sports or esports task; and visually displaying a graphical representation of the plurality of quiet eye times for the plurality of repetitions of the movement action.

10. The method of claim 9, wherein receiving eye gaze data comprises receiving the eye gaze data from eye tracking glasses or a remote eye tracking device.

11. The method of claim 9, comprising performing object detection using the user-view video or screen capture video to determine the task performance outcome of the sports or esports task.

12. The method of claim 9, comprising creating and storing an internal reconstruction of the performance space using the user-view video and the external video or screen capture video of the user.

13. The method of claim 9, comprising outputting an assessment report based on whether or not the user's gaze fixes on the specific location and the performance outcome of the sports or esports task.

14. The method of claim 13, comprising repeatedly updating and outputting the assessment report as the user repeats the movement action.

15. The method of claim 11, wherein determining whether or not the user's gaze fixes on a specific location in a performance space for at least a threshold amount of time prior to the onset of a movement action comprises determining whether or not the user's gaze fixes on the specific location at a particular movement phase of the movement phases.

16. The method of claim 9, wherein determining the performance outcome of the sports or esports task comprises supplying the user-view video to a machine learning classifier trained on training data for the movement action.

17. A system for automated eye tracking and movement assessment for skill development, the system comprising:

a computer user tracking system comprising an eye tracking device and a screen image capturer;

a third-person tracking system comprising at least one external camera; and a computer system comprising one or more processors and configured for:

receiving, while a user is performing a sports or esports task, eye gaze data from the eye tracking device, a screen-capture video from the screen image capturer, and an external video of the user from the external camera;

determining whether or not the user's gaze fixes on a specific location in a performance space for at least a threshold amount of time prior to the onset of a movement action;

determining, using simultaneous localization and mapping (SLAM) of the screen capture video, a performance outcome of the sports or esports task after the movement action;

performing markerless pose-estimation to determine movement phases of the user as the user performs the movement action;

generating, in real time, quiet eye index data that indicates a plurality of quiet eye times for a plurality of repetitions of the movement action, wherein the movement action comprises a movement action of the user while the user is performing the sports or esports task; and visually displaying a graphical representation of the plurality of quiet eye times for the plurality of repetitions of the movement action.

18. The system of claim 17, wherein the computer user tracking system comprises a remote eye tracking device.

19. The system of claim 17, wherein the computer system is configured for performing object detection using the screen capture video to determine the performance outcome of the sports or esports task.

20. The system of claim 17, wherein the computer system is configured for creating and storing an internal reconstruction of the performance space using the screen capture video and the external video of the user.

21. The system of claim 17, wherein determining the performance outcome of the sports or esports task comprises supplying the screen capture video to a machine learning classifier trained on training data for the movement action of the user while the user is performing the sports or esports task.

22. A method for automated eye tracking assessment for skill development, the method comprising:

receiving, while a user is performing a task, eye gaze data from an eye tracking device, a screen capture video from a screen image capturer, and an external video of the user from an external camera;

determining whether or not the user's gaze fixes on a specific location in a performance space for at least a threshold amount of time prior to the onset of a movement action;

determining, using simultaneous localization and mapping (SLAM) of the screen capture video, a performance outcome of the sports or esports task after the movement action;

generating, in real time, quiet eye index data that indicates a plurality of quiet eye times for a plurality of repetitions of the movement action, wherein the movement action comprises a movement action of the user while the user is performing the sports or esports task; and visually displaying a graphical representation of the plurality of quiet eye times for the plurality of repetitions of the movement action.

23. The method of claim 22, comprising performing object detection using the screen capture video to determine the performance outcome of the sports or esports task.

24. The method of claim 22, comprising creating and storing an internal reconstruction of the performance space using the screen capture video and the external video of the user.

25. The method of claim 22, wherein determining the performance outcome of the sports or esports task comprises supplying the screen capture video to a machine learning classifier trained on training data for the movement action.

26. A system for automated data collection and synchronization, the system comprising:

at least one processor and memory storing instructions for the processor;

a client application implemented on the at least one processor and configured for performing movement assessment of a user; and a concurrent collection platform implemented on the at least one processor and configured for supporting the client application by:

collecting a plurality of data streams from a plurality of data collection peripherals while the user performs a sports or esports task, the data streams including eye gaze data from an eye tracking device;

determining whether or not the user's gaze fixes on a specific location in a performance space for at least a threshold amount of time prior to the onset of a movement action;

synchronizing the data streams;

visualizing and analyzing the data streams in support of the movement assessment of the user, wherein analyzing the data streams includes performing simultaneous localization and mapping (SLAM) of a user view video stream to determine a performance outcome of the sports or esports task and performing markerless pose-estimation to determine movement phases of the user as the user performs a movement action of the sports or esports task;

generating, in real time and from the eye gaze data, quiet eye index data that indicates a plurality of quiet eye times for a plurality of repetitions of the movement action; and visually displaying a graphical representation of the plurality of quiet eye times for the plurality of repetitions of the movement action.

27. The system of claim 26, wherein synchronizing the data streams comprises time stamping the data streams.

28. The system of claim 26, wherein visualizing the data streams comprises providing a time-synchronized playback tool for 2D video and 3D kinematics.

29. The system of claim 26, wherein analyzing the data streams comprises performing object detection within at least one video data stream.

30. The system of claim 26, wherein collecting the data streams comprises storing the data streams on a cloud computing system.

31. A method for automated data collection and synchronization, the method comprising:

collecting a plurality of data streams from a plurality of data collection peripherals while a user performs a sports or esports task, the data streams including eye gaze data from an eye tracking device;

synchronizing the data streams;

visualizing and analyzing the data streams in support of a client application performing a movement assessment of the user, wherein analyzing the data streams includes performing simultaneous localization and mapping (SLAM) of a user view video stream to determine a performance outcome of the sports or esports task and performing markerless pose-estimation to determine movement phases of the user as the user performs a movement action of the sports or esports task;

generating, in real time and from the eye gaze data, quiet eye index data that indicates a plurality of quiet eye times for a plurality of repetitions of the movement action of the user; and visually displaying a graphical representation of the plurality of quiet eye times for the plurality of repetitions of the movement action.

32. The method of claim 31, wherein synchronizing the data streams comprises time stamping the data streams.

33. The method of claim 31, wherein visualizing the data streams comprises providing a time-synchronized playback tool for 2D video and 3D kinematics.

34. The method of claim 31, wherein analyzing the data streams comprises performing object detection within at least one video data stream.

35. The method of claim 31, wherein collecting the data streams comprises storing the data streams on a cloud computing system.

* * * * *